J. F. O'CONNOR.
FRICTION DRAFT RIGGING.
APPLICATION FILED APR. 27, 1907.
1,026,113.
Patented May 14, 1912
2 SHEETS—SHEET 2.
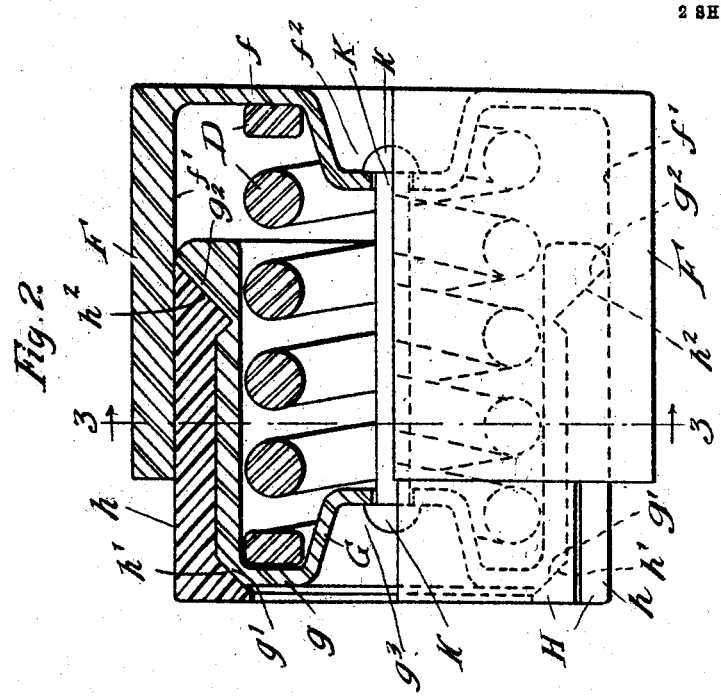
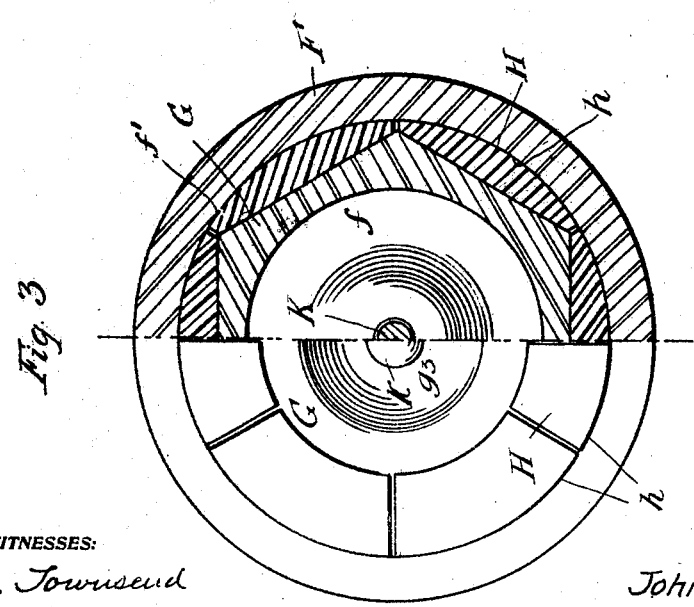
WITNESSES:
F. B. Townsend
H. W. Munday
INVENTOR
John F O'Connor
BY
Munday, Evarts, Adcock & Clarke
his ATTORNEYS

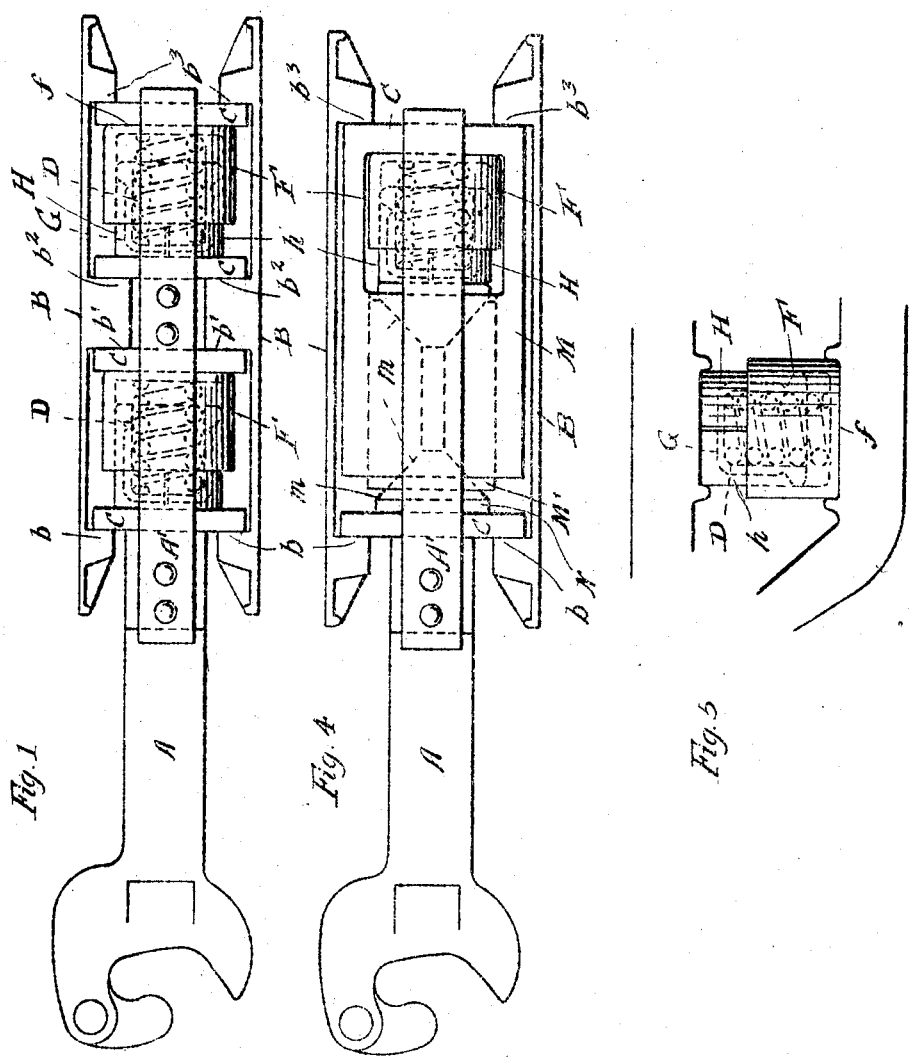

UNITED STATES PATENT OFFICE.

JOHN F. O'CONNOR, OF CHICAGO, ILLINOIS, ASSIGNOR, BY MESNE ASSIGNMENTS, TO WILLIAM H. MINER, OF CHICAGO, ILLINOIS.

FRICTION DRAFT-RIGGING.

1,026,113.  Specification of Letters Patent.  Patented May 14, 1912.

Application filed April 27, 1907. Serial No. 370,551.

*To all whom it may concern:*

Be it known that I, JOHN F. O'CONNOR, a citizen of the United States, residing in Chicago, in the county of Cook and State of Illinois, have invented a new and useful Improvement in Friction Draft-Rigging, of which the following is a specification.

My invention relates to draft rigging for railway cars.

The object of my invention is to provide a tandem spring draft rigging of a simple, efficient and durable construction, composed of few parts, in which the tandem arranged springs will have auxiliary friction or spring dampening devices to increase the cushioning power of the draft rigging and to regulate or govern the release.

My invention consists in the means I employ and herein shown and described, for practically accomplishing this object or result.

In the accompanying drawing forming a part of this specification, Figure 1 is a plan view of a tandem spring draft rigging embodying my invention. Fig. 2 is a detail partial longitudinal section through one of the springs. Fig. 3 is a cross section on line 3—3 of Fig. 2. Fig. 4 illustrates a modification. Fig. 5 illustrates my spring dampening or friction device as applied to other use.

In the drawing, A represents the drawbar, $A^1$ the draw-bar strap or yoke, B the side plates or stop castings which are to be secured to the center sills, draft timbers or other parts of the car framework, and furnished with stops $b$ $b^1$ $b^2$ $b^3$ for the followers C to abut against.

D D are tandem arranged springs between the followers.

F F are friction shells, one inclosing each of the springs D and against the bottom or end $f$ of which one end of each of the springs abuts.

G G are inner cups or shells against the head or end $g$ of which the opposite end of the springs D abut. The friction cup or shell F has an internal friction face $f^1$ parallel to the draw-bar or line of draft.

H H are segmental friction blocks, preferably six in number interposed between the outer shell F and the inner shell G and having exterior friction faces $h$ in sliding friction contact with the interior friction face $f^1$ of the friction shell or cup F. The segmental friction blocks H are also furnished with inclined or wedging faces $h^1$ $h^2$ which engage or coöperate with inclined or wedging faces $g^1$ $g^2$ on the inner friction shell G to force the exterior friction faces $h$ of the segmental blocks H against the interior friction faces $f^1$ of the outer cup or shell F.

The friction shell F, inner shell G and segmental friction blocks H surround the spring D and are interposed between the followers C C. As the spring D is compressed by the followers acting directly against the friction shell F and segmental friction blocks H, the shells F, G and blocks H telescope together and exert a frictional resistance auxiliary to the tensional resistance of the spring D and in releasing as the spring expands, these friction devices F, G, H regulate or govern the release.

The shells F G are movably connected together by a longitudinal rod or rivet K, the heads $k$ of which fit in central recesses $f^2$ $g^3$ in the heads or ends $f$, $g$ of the shells F, G, these recesses or depressions being deep enough to permit the necessary telescopic movement of the shells F G.

As illustrated in Fig. 4, where only one pair of followers is employed, and in which the rear follower is made integral with a friction shell M, friction blocks $M^1$ having wedging faces $m$ which coöperate with wedges N are substituted for one of the tandem arranged springs D and one set of friction shells F, G and segmental friction blocks H.

In the modification illustrated in Fig. 5, the spring, outer friction shell, inner cup or shell and segmental friction blocks are illustrated as being interposed between two members of a car truck frame. The friction shell F is preferably circular or cylindric in shape. The shell G preferably has a circular of cylindric interior with polygonal sides or outer faces. The segmental friction blocks H preferably have curved outer friction faces and flat inner faces.

In Fig. 1 of the drawing, I have illustrated the friction or spring dampening shells F D and segmental friction blocks H as surrounding or applied to both the front and rear tandem springs D, but it will be understood by those skilled in the art that the shells F D and friction blocks H may be omitted for one of the two tandem springs C C.

I claim:—

1. In a tandem spring draft rigging, the combination with a draw-bar, front, rear and intermediate stops and front, rear and intermediate followers, two tandem arranged sets of coöperating friction and spring containing telescoping shells, a spring within each set of shells, each set comprising an inner shell against which one end of the contained spring abuts and an outer shell against which the other end of the contained spring abuts, and segmental friction blocks between the inner and outer shells of each set, said tandem arranged springs and said tandem arranged sets of friction shells coacting together to cushion both pulling and buffing movements of said draw-bar, substantially as specified.

2. In a tandem spring draft rigging, the combination with a draw-bar, front, rear and intermediate stops and front, rear and intermediate followers, two tandem arranged sets of coöperating friction and spring containing telescoping shells, a spring within each set of shells, each set comprising an inner shell against which one end of the contained spring abuts and an outer shell against which the other end of the contained spring abuts, and segmental friction blocks between the inner and outer shells of each set, said friction blocks and one of the shells of each set having interengaging wedging faces, said tandem arranged springs and said tandem arranged sets of friction shells coacting together to cushion both pulling and buffing movements of said draw-bar, substantially as specified.

3. In a draft rigging, the combination with a draw-bar, stops and followers, of a spring between the followers, a pair of telescoping shells both surrounding said spring, and each having a closed head at one end against which one end of the spring abuts, segmental friction blocks interposed between the telescoping shells and provided with wedging faces at each end thereof, and one of said shells having coöperating wedge faces, one pair at each end thereof, substantially as specified.

JOHN F. O'CONNOR.

Witnesses:
EDMUND ADCOCK,
PEARL ABRAMS.